(No Model.)
P. P. HERBERG & P. H. CLAUSSEN.
PLOW ATTACHMENT.
No. 255,981. Patented Apr. 4, 1882.
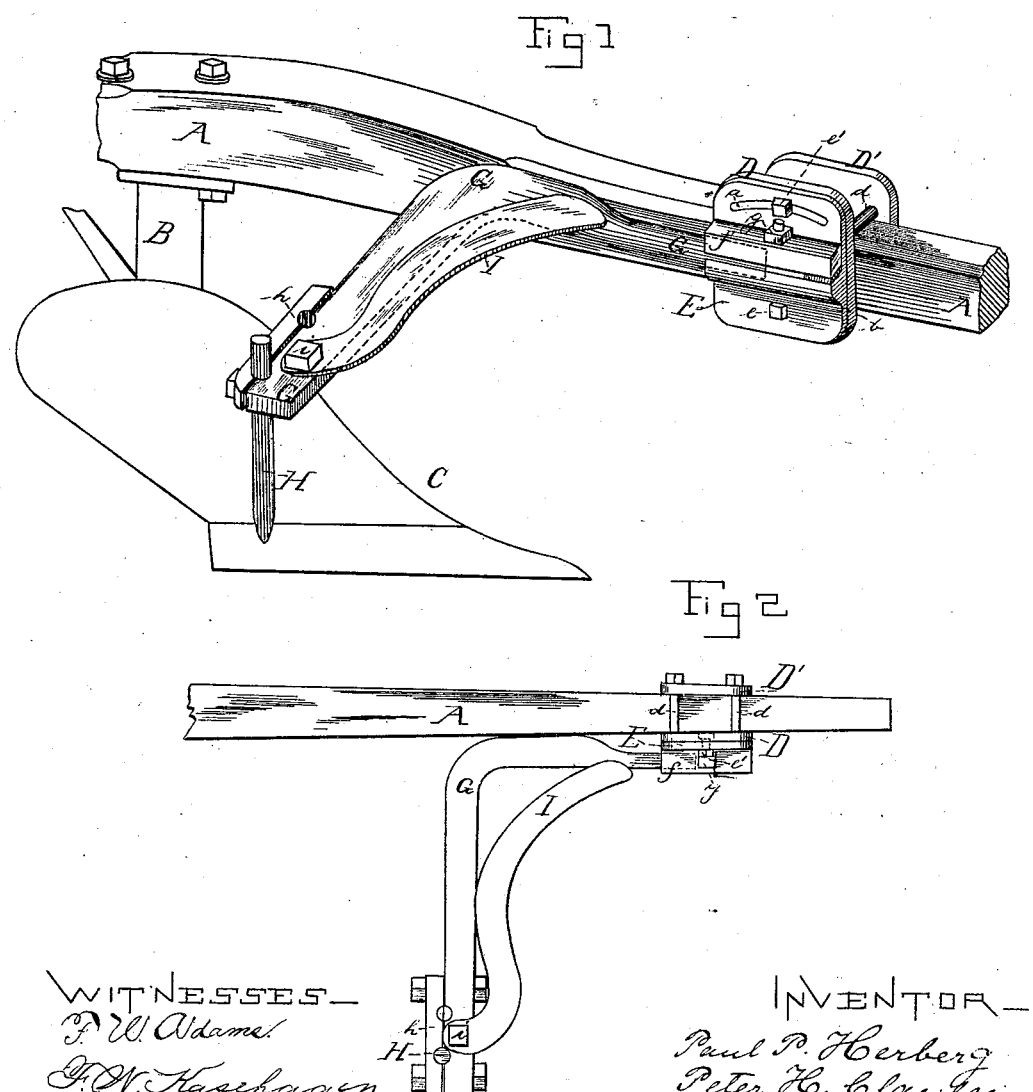

UNITED STATES PATENT OFFICE.

PAUL P. HERBERG AND PETER H. CLAUSSEN, OF GALE, WISCONSIN.

PLOW ATTACHMENT.

SPECIFICATION forming part of Letters Patent No. 255,981, dated April 4, 1882.

Application filed February 6, 1882. (No model.)

*To all whom it may concern:*

Be it known that we, PAUL P. HERBERG and PETER H. CLAUSSEN, both of the town of Gale, in the county of Trempealeau and State of Wisconsin, have invented certain new and useful Improvements in Plow Attachments; and we do hereby declare that the following is a full, clear, and exact description thereof, reference being had to the accompanying drawings, and to the letters of reference marked thereon, which form a part of this specification.

This invention relates to attachments for plow-beams designed for breaking and for folding under the bottom of the furrow all weeds, cornstalks, and stubble-grass; and it is our object to produce such an attachment for that purpose that is secured to the plow-beam by clamping, and can be readily adjusted to suit all kinds of plows and all intended purposes.

Therefore our invention consists of the novel devices and combinations of devices, as hereinafter described and specifically claimed.

In the accompanying drawings, Figure 1 represents a perspective side view of a plow having our attachment, and Fig. 2 a plan view of the attachment as secured to a plow-beam.

Like letters designate corresponding parts in all the figures.

A denotes a portion of the plow-beam; B, the standard, and C the plowshare. D and D' are two plates that are placed against the two opposite sides of the plow-beam, and are secured in position by a series of clamp-bolts, $d\ d$, which draw the two plates D D' tight against the plow-beam and make them rigid therewith without weakening said plow-beam. Against the clamp-plate D is secured another plate, E, by two bolts, $e$ and $e'$. The bolt $e$ in this case forms the fulcrum on which said plate E can be turned, and the bolt $e'$ is passed through a segmental slot, $a$, in plate E, that will allow an angular adjustment of said plate E relative to plate D. This plate E has a shell, $b$, cast to its face, which, in combination with the cap $f$ and bolt $g$, forms a cylindrically-socketed clamp for adjustably holding the cylindrical end of an elbow-shaped arm, G. This arm G first extends parallel with and close to the plow-beam rearward, and then it is bent so as to extend rectangularly from the plow a proper distance, in conformity with the width of the furrow to be turned. The rear edge of the end of arm G has a clamp plate, $h$, secured by screws, and both the edge of said arm G and the plate $h$ are notched for holding a pin, H, that may be inserted in either notch, and may be adjusted to project downward more or less.

I is a somewhat S-shaped flat plate, which with one end is pivotally secured upon the end of arm G by a bolt, $i$, and extends toward the plow-beam. This plate I by its curvature will push the weeds or cornstalks outward against pin H, where they will be bent down, broken, and folded under the furrow as the plow is moved along the field.

It will be seen that our weed and cornstalk breaking attachment can be adjusted as to height and angle in every direction, so as to have the pin H and plate I in proper position to the plowshare and mold-board for any kind of litter that is to be covered by the furrows.

The device is simple and strong, is easily attached to or removed from the plow-beam, and requires no skill for taking apart or adjusting it.

What we claim is—

1. The attachment to a plow-beam, consisting of the clamp-plates D D' and adjustable plate E, with clamp-socket $b\ f$, in combination with arm G, pin H, and plate I, all constructed and arranged substantially as described and shown.

2. The attachment to a plow-beam, consisting of clamp D and adjustable plate E, with clamp-socket $b\ f$, in combination with arm G, having clamp-plate $h$ for holding pin H, and plate I, secured by bolt $i$, all arranged substantially as shown and described.

In testimony that we claim the foregoing as our invention we affix our signatures in presence of two witnesses.

PAUL P. HERBERG.
PETER H. CLAUSSEN.

Witnesses:
L. H. FEIRING,
CHAS. L. KEANDRUD.